US009595141B2

(12) United States Patent
Mohaupt et al.

(10) Patent No.: US 9,595,141 B2
(45) Date of Patent: Mar. 14, 2017

(54) DIAGNOSTIC DEVICE FOR MOTOR VEHICLES AND DIAGNOSTIC METHOD

(75) Inventors: Jens Mohaupt, Pliezhausen (DE); Klaus Schneider, Ludwigsburg (DE); Stefan Schmitt, Canton, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 14/117,817

(22) PCT Filed: Mar. 27, 2012

(86) PCT No.: PCT/EP2012/055367

§ 371 (c)(1),
(2), (4) Date: Apr. 9, 2015

(87) PCT Pub. No.: WO2012/159799

PCT Pub. Date: Nov. 29, 2012

(65) Prior Publication Data

US 2015/0213655 A1 Jul. 30, 2015

(30) Foreign Application Priority Data

May 24, 2011 (DE) ........................ 10 2011 076 378

(51) Int. Cl.
*G06F 19/00* (2011.01)
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0858* (2013.01); *G07C 2205/02* (2013.01)

(58) Field of Classification Search
CPC .. G07C 5/008; G07C 5/0808; G07C 2205/02; G07C 5/085; G07C 5/0858;
(Continued)

(56) References Cited

U.S. PATENT DOCUMENTS 7,142,960 B2 11/2006 Grier et al.
2007/0043493 A1* 2/2007 Borke ................. B60N 2/0248 701/45

(Continued)

FOREIGN PATENT DOCUMENTS

CN 101789026 A 7/2010
CN 101998235 A 3/2011
DE 20 2006 019 993 U1 8/2007

OTHER PUBLICATIONS

International Search Report for PCT/EP2012/055367, issued on Mar. 27, 2012.

*Primary Examiner* — Muhammad Shafi
(74) *Attorney, Agent, or Firm* — Gerard Messina

(57) ABSTRACT

A diagnostic device for motor vehicles includes at least one first interface for reading out error status information from a memory of a motor vehicle, at least one second interface for receiving and/or transmitting community content and error status information, an operating device for operating the diagnostic device by a user, a display device for displaying the information, and a processing device for processing the information, the processing device being connected to the first and the second interfaces and the processing device being designed to transmit and process the community content and error status information with the aid of the first and/or the second interfaces and to display this information with the aid of a display device. A diagnostic method for motor vehicles, a diagnostic system, as well as a use of a diagnostic device are also described.

7 Claims, 2 Drawing Sheets

(58) Field of Classification Search
CPC .......... B60N 2002/0272; B60N 2/0232; B60N 2/0276; B60N 2002/0268; B60N 2/002; B60N 2/0248; B60N 2/28; B60N 2/2806; B60N 2/2863; B60N 2/4852
USPC ......... 701/31.5, 31.4, 31.6, 31.7, 31.8, 31.9, 701/29.9, 29.7, 29.6, 30.3, 34.4; 340/990, 340/995.1, 853.2, 539.24
See application file for complete search history.

(56) References Cited

U.S. PATENT DOCUMENTS

| | | | | |
|---|---|---|---|---|
| 2008/0306645 | A1 | 12/2008 | Dewhurst et al. | |
| 2010/0023203 | A1* | 1/2010 | Shibi .................... | G07C 5/0808 701/31.4 |
| 2011/0015998 | A1 | 1/2011 | Hirschfeld | |
| 2011/0045842 | A1 | 2/2011 | Rork et al. | |
| 2011/0112717 | A1* | 5/2011 | Resner ................... | G07C 5/008 701/31.4 |
| 2011/0166897 | A1* | 7/2011 | Beckman ............... | G07B 15/02 705/5 |

* cited by examiner

DIAGNOSTIC DEVICE FOR MOTOR VEHICLES AND DIAGNOSTIC METHOD

CROSS REFERENCE TO RELATED APPLICATION

The present application is the national stage entry of International Patent Application No. PCT/EP2012/055367, filed on Mar. 27, 2012, which claims priority to Application No. DE 10 2011 076378.3, filed in the Federal Republic of Germany on May 24, 2011.

FIELD OF INVENTION

The present invention relates to a diagnostic device for motor vehicles, a diagnostic method for motor vehicles, a diagnostic system, as well as a use of a diagnostic device.

BACKGROUND INFORMATION

To be able to detect defects in motor vehicles or to carry out services on these, diagnostic devices are used in today's motor vehicles. A diagnostic device of this type is described in German Application No. DE 20 2006 019 993 U1, for example.

The mobile diagnostic device for motor vehicles described in German Application No. DE 20 2006 019 993 U1 includes a first interface for establishing a data link to a diagnostic interface of the vehicle electronic system and at least one processor unit for controlling the first interface and for reading out diagnostic data from an error memory of the vehicle electronic system. The mobile diagnostic device is in this case used by an appropriately trained operator. In addition, appropriate documentation of the motor vehicle manufacturer or also training courses, etc., may be made available to the operator of such a diagnostic device for diagnosing defects in motor vehicles.

SUMMARY

According to the present invention, a diagnostic device for motor vehicles is described, including at least one first interface for reading out error status information from a memory of a motor vehicle, at least one second interface for receiving and/or transmitting community content and error status information, an operating device for operating the diagnostic device by a user, a display device for displaying the information, and a processing device for processing the information, the processing device being connected to the first and the second interfaces and the processing device being designed to transmit and process the community content and error status information with the aid of the first and/or the second interface(s) and to display this information with the aid of the display device.

According to the present invention, a diagnostic method for motor vehicles is described, including the steps of reading out the error status information from a memory of a motor vehicle, processing the read-out error status information, displaying the processed error status information for a user, receiving and/or transmitting community content information, in particular from and/or via the Internet, processing the transmitted and/or received community content information, and displaying the processed community content information.

According to the present invention, a diagnostic system including a motor vehicle and a diagnostic device described herein is described.

According to the present invention, a use of a diagnostic device described herein for diagnosing defects in motor vehicles is described.

Community content information is preferably understood to mean, according to the present invention, information which is exchanged in chat rooms, with the aid of instant messenger, in Internet forums, and in virtual interest communities or in social networks, such as Facebook, Xing, StudiVZ, or the like and likewise personalized information of the particular users of the chat rooms and the like, in particular access and login information.

According to the present invention, error status information is preferably understood to mean information which contains an error status of the motor vehicle, e.g., in the form of codes, abbreviations, measured values, signals, or the like.

According to the present invention, status information is understood to mean information which represents the status of a person in connection with the online community, e.g., "absent," "working," "invisible," "offline," or the like.

One of the advantages achieved with the present invention is that information may be provided more rapidly to a user of the diagnostic device. Moreover, the provided second pieces of information are more current than, for example, the pieces of information which are made available as documentation hard copies by the manufacturer of the motor vehicle, for example. Moreover, the diagnostic device may make available additional information of other users from authorized dealerships, free dealerships, or also amateurs in this way so that a user of the diagnostic device may recognize and eliminate errors and defects on the vehicle more comprehensively, more rapidly and more reliably. In this case, the provided second pieces of information may also be made available offline and online. For example, the most relevant contributions or threads to a predefined topic may be regularly buffered in the diagnostic device, even if a user does not need them at this very moment. It is then possible to retrieve them offline, i.e., without an existing Internet connection. Thus, a high availability of current contributions or threads is directly possible. At the same time, it may be checked in the background in parallel to a diagnosis of a motor vehicle whether more current contributions regarding the predefined topic or problem exists and this may be displayed to a user as a list, for example, in particular categorized according to their relevance.

The present invention uses the fact that users, e.g., of social networks, have very little inhibitions when it comes to providing community content and that no additional programs are necessary to do this except for the Internet browser, for example. The present invention uses the other fact that users, e.g., of special motor vehicle forums, regularly have great technical knowledge, and the information in the forums is current and covers many different vehicles and models. The display device may be designed such that current community content information is displayed and this information in particular partially superimposes the error status information or visualizes it with the aid of the displayed links. It is also possible to display the community content information by way of a dialog for sending off a question for an Internet forum and the like with the aid of the display device.

According to one advantageous exemplary embodiment of the present invention, an identification device for the user is situated and the processing device is designed to process the identification information as community content information and to transmit this information to a computer in an external network with the aid of the Internet with the aid of the second interface. The advantage thus achieved is that a user of the diagnostic device may, for example, enter access information for Internet discussion forums at the diagnostic device and this information is then transmitted automatically. The user of the diagnostic device may then be logged in automatically with his/her user name, etc., and may create requests, so-called threads, or look for corresponding problems in the forums with the aid of the search function.

According to one advantageous exemplary embodiment of the present invention, the processing device is designed to process vehicle identification information as community content information and to transmit this information. The advantage thus achieved is that vehicle information, e.g., in the form of product and/or manufacturer codes, is displayed in a processed, comprehensible form directly also to the members of an Internet forum who do not know the product and the manufacturer codes. This also makes possible an even more accurate classification of a question or a problem in the Internet forum. Furthermore, contributions or threads of the user may be automatically provided with this vehicle information in order to assign the contents of the threads to the appropriate vehicle.

According to another advantageous exemplary embodiment of the present invention, the operating device and/or the processing device is/are designed to provide status information regarding the user, and the processing device is designed to process the status information as community content information and to transmit this information to a computer in an external network with the aid of the Internet with the aid of the second interface. It is possible in this way that, for example, in a forum a corresponding user entry is marked as "important," etc., when the user is entering the status "troubleshooting" with the aid of the operating device, so that the participants of the corresponding forum receive the opportunity of immediately providing appropriate information for the user of the diagnostic device in the forum. At the same time, the user of the diagnostic device receives the opportunity of obtaining with the aid of the diagnostic device directly relevant information, e.g., news about a certain error or about a certain vehicle, or the like, in particular in a processed form by the processing device.

After eliminating an error of the motor vehicle by a user of the diagnostic device, the user may, for example, use the operating device to assess a helpful contribution for eliminating the error, in particular based on a scale between 1 to 10, in particular between 1 to 5.

According to another advantageous exemplary embodiment of the present invention, the processing device is designed to identify and to process information, in particular motor-vehicle specific information, predefinable from the received community content information, and the display device is designed to display the processed information to the user. The advantage thus achieved is that motor-vehicle specific information, in particular, is made available to the user of the diagnostic device in a simple and rapid manner, so that he/she is given the information graphically processed, if necessary, on the diagnostic device with the aid of the display device, for example, which significantly simplifies the troubleshooting in motor vehicles in the case of circuit diagrams, wiring, etc., for example. Likewise, color codes, enlargements, detail representations and/or easily comprehensible symbols are conceivable for the practical processing of predefined information.

According to another advantageous exemplary embodiment of the present invention, the processing device and/or the display device is/are designed to adapt and/or display the error status information and/or the community content information based on a predefinable parameter. The advantage thus achieved is that the user of the diagnostic device is thus informed in a targeted manner and that information of the motor vehicle which is not important for him/her is blanked out, if necessary. For example, it is possible to adapt and/or display information such that it is embedded in the work sequences and/or processes of the user of the diagnostic device to the best possible extent. Here, after entering the appropriate vehicle identification characteristics and symptoms, for example, with the aid of the operating device and after transmitting the appropriate information to the computer in the external network, forum contributions relevant to the corresponding motor vehicle or to the corresponding error are displayed with the aid of the diagnostic device or new contributions and/or questions are displayed and/or posted in the forum. At the same time, the diagnostic device may, for example, continuously check as to whether there are already responses in the forum to a question of the user of the diagnostic device and if yes, the appropriate responses are downloaded and displayed to the user of the diagnostic device with the aid of the display device. A response may, for example, be classified in this case in this way if at least one characteristic of the vehicle identification characteristics and/or a corresponding symptom of an error is present.

According to one advantageous exemplary embodiment of the method, a piece of identification information of the user is processed as community content information and transmitted to a computer of an external network with the aid of the Internet. The advantage thus achieved is that a user of the diagnostic device is, for example, able to enter access information for Internet discussion forums at the diagnostic device and this information is then automatically transmitted, and that the user of the diagnostic device is automatically logged in with his/her user name, etc., and is able to create requests, so-called threads, or to search for corresponding problems in the forums with the aid of the search function.

According to another advantageous exemplary embodiment of the method, the transmitted and/or received information is/are processed based on a predefinable parameter. The advantage thus achieved is that the user of the diagnostic device is thus informed in a targeted manner and that information of the motor vehicle which is not important for him/her is blanked out. For example, it is possible to adapt and/or display information such that it is embedded in the work sequences and/or processes of the user of the diagnostic device to the best possible extent.

According to another advantageous exemplary embodiment of the method, information, in particular motor-vehicle specific information, predefinable from the received community content information is identified and processed and, in particular, displayed. The advantage thus achieved is that the user of the diagnostic device receives at the same time the opportunity of obtaining with the aid of the diagnostic device directly relevant information, e.g., news on a certain error or on a certain vehicle, or the like, in particular processed by the processing device.

Further advantages and features of exemplary embodiments of the present invention are described in the following description with reference to the accompanying drawings.

DETAILED DESCRIPTION

Figure 1:
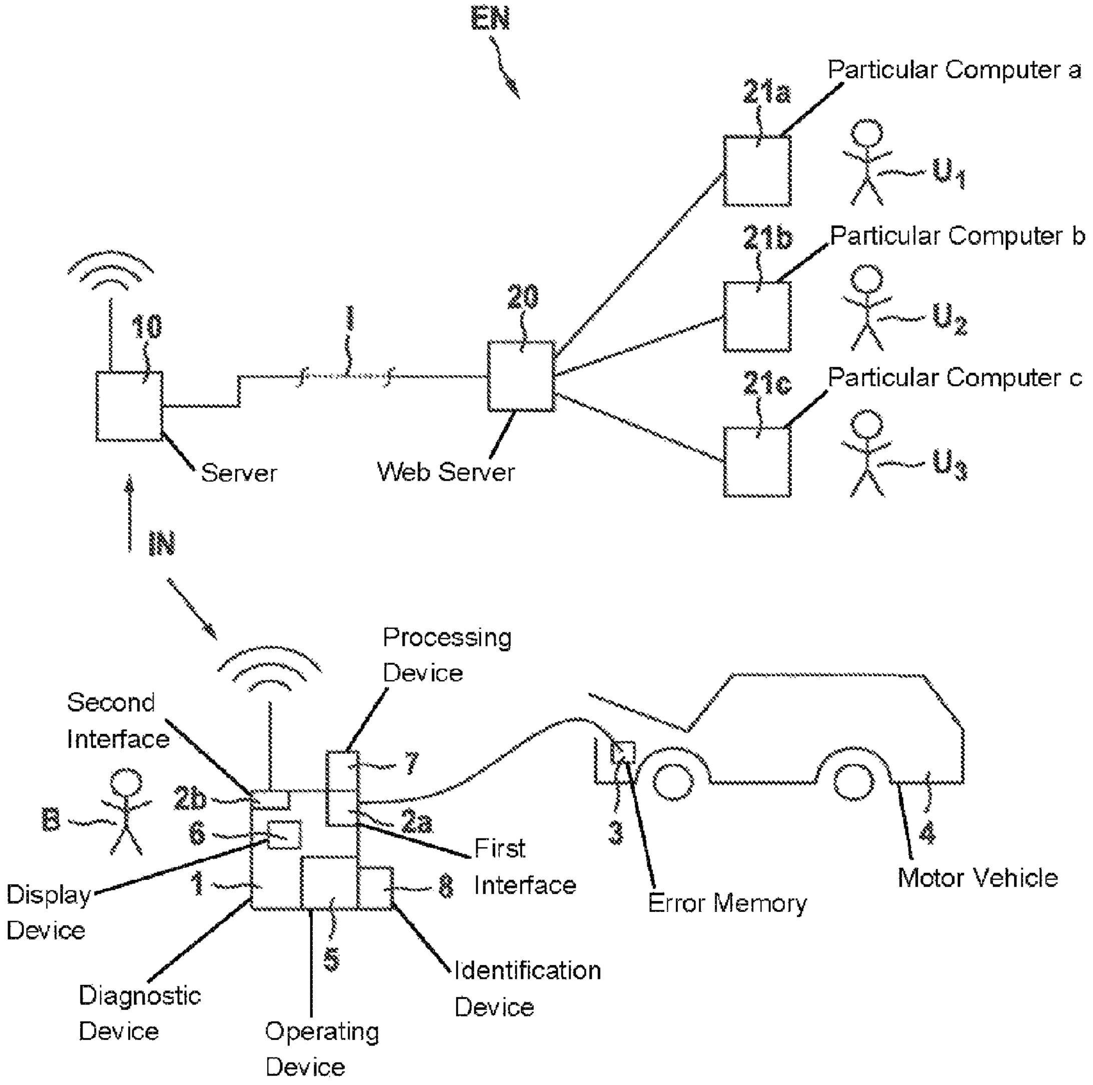
FIG. 1 schematically shows a diagnostic device according to an exemplary embodiment connected to a computer of an external network.

FIG. 1 schematically shows a diagnostic device according to an exemplary embodiment connected to a computer of an external network.

In FIG. 1, reference numeral 1 denotes a diagnostic device according to one exemplary embodiment of the present invention. Diagnostic device 1 includes at least one first interface 2*a* for reading out error status information from an error memory 3 of a motor vehicle 4. Interface 2*a* is, for example, wired and connected to a corresponding interface of error memory 3 of motor vehicle 4. Diagnostic device 1 further includes an operating device 5 for operating the diagnostic device by a user B. To be able to display information to user B, diagnostic device 1 includes a display device 6 for displaying information, e.g., a monitor, a dot matrix display, a touch screen, or the like. Diagnostic device 1 further includes a processing device 7 for processing information, e.g., the error status information from error memory 3 of motor vehicle 4. If, for example, the error status information is present in the form of an alphanumerical code, which is not readily comprehensible or detectable, processing device 7 may process this information based on a table included in a memory of the diagnostic device such that it is more readily comprehensible to user B. Processing device 7 therefore cooperates with display device 6 such that display device 6 displays the processed information to user B.

Diagnostic device 1 further includes a second interface 2*b* which is connected to processing device 7. Community content information may be transmitted and/or received via second interface 2*b*. Second interface 2*b* is designed in FIG. 1 as a wireless radio interface. In FIG. 1, processing device 7 establishes with the aid of interface 2*b* a radio contact to a server 10 in an internal network IN, e.g., the network of the repair shop of user B, which is further connected to Internet I. Server 10 is connected via Internet I, for example, to a web server 20 which provides a forum about motor vehicles of the make XYZ, for example. Web server 20 is in this case located in an external network EN which is also connected to Internet I. Different users $U_1$ through $U_3$ of web server 20 are connected to web server 20 via particular computers 21*a* through 21*c* and read/write contributions into the forum on web server 20. Processing device 7 of diagnostic device 1 is designed such that information is retrieved from the Internet, e.g., from web server 20, and/or transmitted to this web server with the aid of the Internet, the received and/or transmitted information including community content information, i.e., for example, information of the forum in the form of contributions, threads, etc., on web server 20.

If, for example, an error of motor vehicle 4 is now to be found with the aid of diagnostic device 1, user B connects diagnostic device 1 to error memory 3 of motor vehicle 4 and reads it out with the aid of diagnostic device 1. After processing the read-out error status information from error memory 3 of motor vehicle 4 with the aid of processing device 7, user B is able to enter access information, e.g., login name and password, for an online forum on web server 20 at diagnostic device 1 with the aid of operating device 5.

Diagnostic device 1 subsequently transmits the corresponding identification information with the aid of interface 2*b* in internal network IN to server 10 which is connected to Internet I. Server 10 transmits the identification data or information via Internet I to web server 20; user B is logged in using the transmitted data or information into the corresponding forum of web server 20. Diagnostic device 1 may furthermore transmit vehicle data, entered additionally by user B, such as make, type, model series, as well as in particular other characteristics for unambiguous identification of the vehicle itself via above-mentioned server 10 to web server 20 as well as the corresponding, read-out error status information of memory 3 of motor vehicle 4, after this information has been processed as community content information, and finally automatically prepares a corresponding entry in the Internet forum for the particular type of vehicle 4.

Processing may, for example, take place by error codes of the error status information being replaced by more readily comprehensible text and corresponding formatting of the text, as well as by embedding into a corresponding entry template or processing for a user interface of the forum. Users $U_1$ through $U_3$ of the forum may then read the entry in the forum immediately after the corresponding entry has been created and assist with troubleshooting. If, for example, user $U_2$ already knows a resolution for the corresponding error, he/she writes a corresponding entry with the aid of his/her computer 21*b* and transmits this entry to the corresponding thread in the forum on web server 20. Diagnostic device 1 now receives the corresponding response of user $U_2$ from web server 20, e.g., by accordingly continuously monitoring the forum on web server 20 for new contributions or responses, and downloads this response with the aid of computer 10 and processing device 7 from web server 20. Processing device 7 processes this information and makes it available to user B of diagnostic device 1 with the aid of display device 6. User B is then able to take appropriate measures to eliminate the error in motor vehicle 4.

Figure 2:
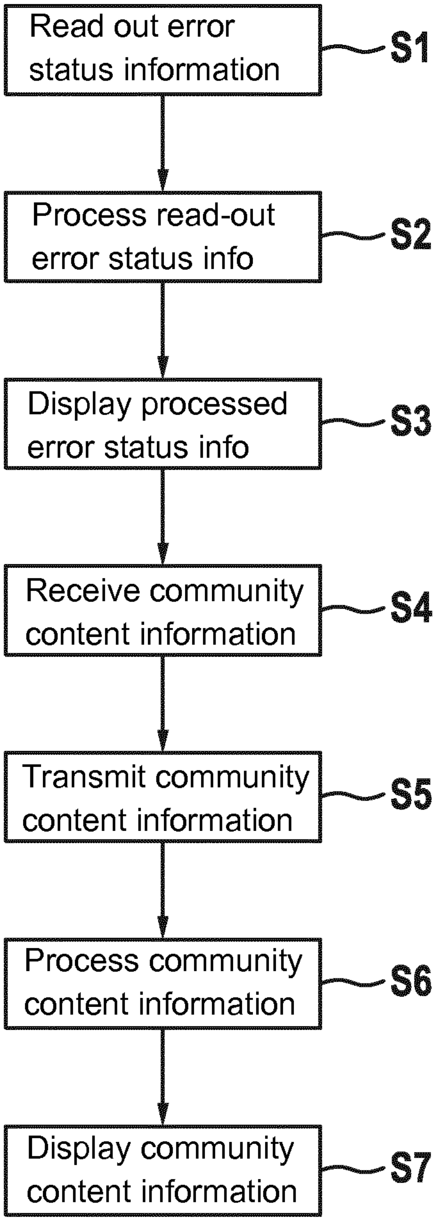
FIG. 2 schematically shows steps of a method according to an exemplary embodiment of the present invention.

FIG. 2 schematically shows steps of a method according to one exemplary embodiment of the present invention.

In FIG. 2, reference numeral S1 denotes the step of reading out the error status information from a memory 3 of a motor vehicle 4; reference numeral S2 denotes the step of processing the read-out error status information; reference numeral S3 denotes the step of displaying S3 the processed error status information for a user B; reference numeral S4 denotes the step of receiving and/or reference numeral S5 denotes the step of transmitting S5 community content information in particular from and/or via Internet I; reference numeral S6 denotes the step of processing S6 the transmitted and/or received community content information, and reference numeral S7 denotes the step of displaying S7 the processed community content information.

Overall, the present invention offers multiple advantages. The present invention allows a rapid diagnosis of errors in motor vehicles and services. Moreover, corresponding diagnoses may be checked and/or retraced reliably by a plurality of users. Errors in the diagnosis are therefore significantly reduced.

Although the present invention has been described above on the basis of one preferred exemplary embodiment, it is not limited thereto, but may be modified in multiple ways.

What is claimed is:

1. A diagnostic device for motor vehicles, comprising:

at least one first interface adapted for reading out error status information from a memory of a motor vehicle, at least one second interface adapted for receiving and/or transmitting community content and error status information, an operating device adapted for operating the diagnostic device by a user, a display device adapted for displaying the information, and a processing device adapted for processing the information, the processing device being connected to the first and the second interfaces and the processing device being adapted to transmit and process the community content and error status information with the aid of the first and/or the second interfaces and to display the processed information with the aid of the display device, wherein, for unambiguous identification of the motor vehicle, the diagnostic device is adapted to transmit vehicle identification characteristics to a web server with the aid of the second interface as well as the corresponding read-out error status information of the memory of the motor vehicle, after the information has been processed as community content information by the processing device, and wherein the processing device is adapted to identify motor-vehicle specific information predefinable from the received community content information in the form of relevant forum contributions to the corresponding motor vehicle or to the corresponding errors, when at least one characteristic of the vehicle identification characteristics and/or one corresponding symptom of an error is present.

2. The diagnostic device according to claim 1, further comprising:

an identification device for the user, wherein the processing device is adapted to process identification information of the user as community content information and to transmit the identification information to a computer in an external network with the aid of Internet and the second interface.

3. The diagnostic device according to claim 1, wherein the processing device is adapted to process the vehicle identification information as community content information and to transmit the vehicle identification information.

4. The diagnostic device according to claim 1, wherein the operating device and/or the processing device is/are adapted to provide status information via the user, and the processing device is adapted to process the status information as community content information and to transmit the status information to a computer in an external network with the aid of Internet and the second interface.

5. The diagnostic device according to claim 1, wherein the processing device is adapted to identify and to process motor-vehicle specific information, predefinable from the received community content information, and the display device is adapted to display the processed motor-vehicle specific information to the user.

6. The diagnostic device according to claim 1, wherein the processing device and/or the display device is/are adapted to adapt and/or to display the error status information and/or the community content information based on a predefinable parameter.

7. A diagnostic system, comprising:

a motor vehicle, and a diagnostic device for motor vehicles, comprising:

at least one first interface adapted for reading out error status information from a memory of the motor vehicle, at least one second interface adapted for receiving and/or transmitting community content and error status information, an operating device adapted for operating the diagnostic device by a user, a display device adapted for displaying the information, and a processing device adapted for processing the information, the processing device being connected to the first and the second interfaces and the processing device being adapted to transmit and process the community content and error status information with the aid of the first and/or the second interfaces and to display the processed information with the aid of the display device, wherein, for unambiguous identification of the motor vehicle, the diagnostic device is adapted to transmit vehicle identification characteristics to a web server with the aid of the second interface as well as the corresponding read-out error status information of the memory of the motor vehicle, after the information has been processed as community content information by the processing device, and wherein the processing device is adapted to identify motor-vehicle specific information predefinable from the received community content information in the form of relevant forum contributions to the corresponding motor vehicle or to the corresponding errors, when at least one characteristic of the vehicle identification characteristics and/or one corresponding symptom of an error is present.

* * * * *